United States Patent Office 3,420,645
Patented Jan. 7, 1969

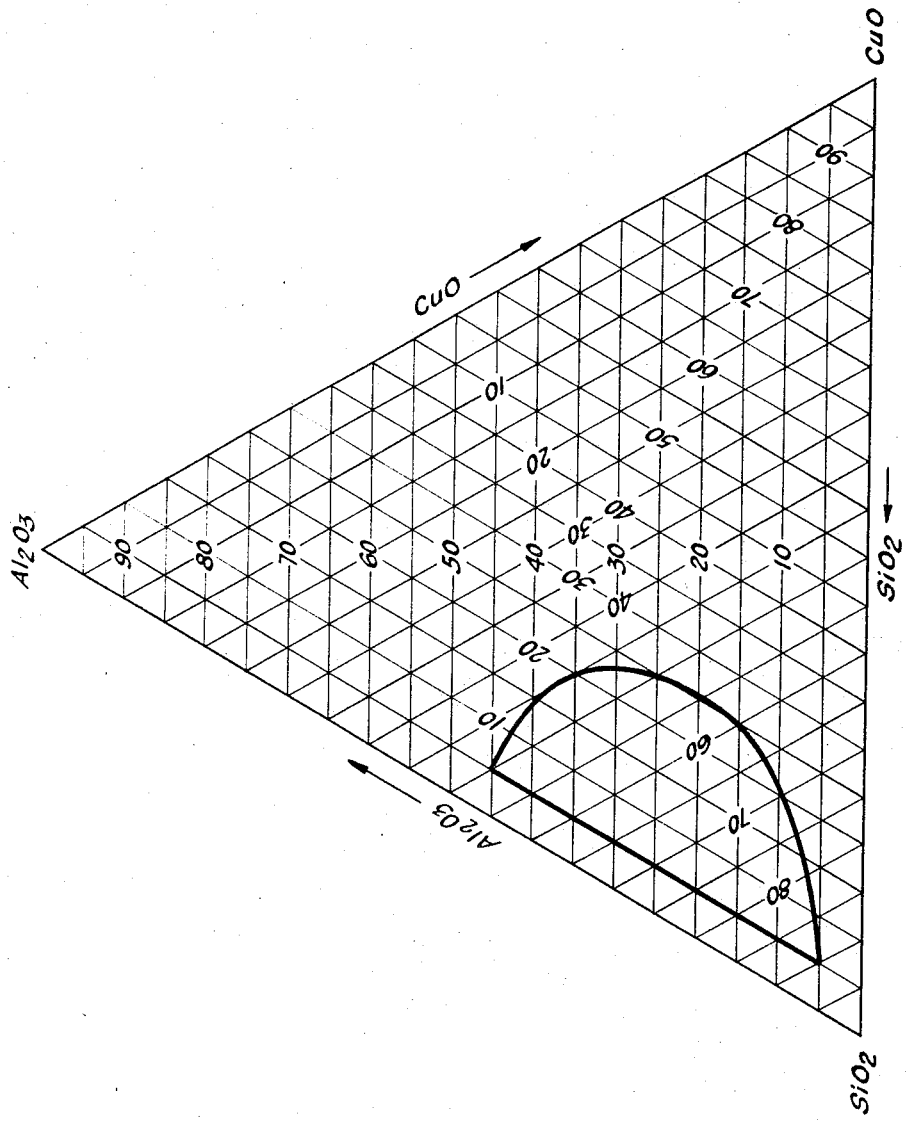
INVENTOR.
MICHAEL L. HAIR
BY *Gerhard K. Adam*
his *Attorney*

3,420,645
METHOD FOR MAKING HOLLOW GLASS PARTICLE HAVING A METALLIC COPPER COATING
Michael L. Hair, Corning, N.Y., assignor to Corning Glass Works, Corning, N.Y., a corporation of New York
Filed June 16, 1966, Ser. No. 558,041
U.S. Cl. 65—21
Int. Cl. C03c *21/00;* C03b *19/10*
7 Claims

ABSTRACT OF THE DISCLOSURE

Method of making hollow glass particles by forming solid particles of an aluminosilicate glass containing an effective amount of copper oxide and heating the particles in a hydrogen containing atmosphere at a temperature of 600–1000° C. and for a time of 5–120 minutes sufficient to cause migration of the copper oxide, whereby a metallic copper coating is formed on the surface of the particle and the particle becomes expanded.

---

This invention relates to low density hollow glass particles and in particular to a process for forming small hollow glass spheres having a metallic copper coating.

Recent interest in the field of oceanography has created a demand for small microspherical bubbles to be used as flotation agents. These bubbles can be used either by themselves or as light weight aggregates in syntactic foams. Heretofore, hollow spheres were made by the process, as illustrated by United States Patent No. 2,978,-340, from finely divided particles of material capable of forming a glass upon fusion in an admixture with a compound which liberates a gas at the fusion temperature. The particles were prepared by intimately mixing an aqueous solution or slurry of an alkali metal silicate, a silicate insolubilizing agent, and a gasifying agent such as inorganic salts, e.g. sodium carbonate, and organic compounds, e.g. urea. The solid materials were fed into a tubular furnace having an updraft flow at a temperature typically of 2,000° F., at which the particle fused and simultaneously the gasifying agent decomposed. Unfortunately, the small hollow spheres made from glass or plastic commercially available suffer from the disadvantage that they are not able to withstand high pressures such as are encountered in oceanographic use.

It is, therefore, an object of the present invention to provide hollow glass particles capable of withstanding high pressures.

In accordance with the present invention, I have discovered a method of making hollow glass particles by forming solid particles of an aluminosilicate glass containing an effective amount of copper oxide and heating the particles in a hydrogen containing atmosphere at elevated temperatures to cause migration of the copper ions in the glass. During the heat treatment, the particle becomes expanded and a metallic copper coating is formed on the outer surface thereof. My process essentially involves two steps: the formation of solid particles of a glass containing copper oxide and the expansion of the solid particles by a heat treatment in a reactive atmosphere. Expansion of the small particles occurs as a result of the reduction of the copper oxide by the hydrogen gas to form steam at the high temperatures of the heat treatment. The reaction may be considered as follows:

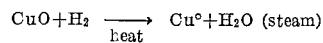

The starting materials are aluminosilicate glasses comprised in mole percent on the oxide basis of the following:

| Ingredient— | Mole percent |
|---|---|
| Alkali metal oxide | 0–20 |
| Alkaline earth metal oxide | 0–10 |
| Alumina | 5–30 |
| Silica | 50–90 |
| Copper oxide | 5–40 |

Referring now to the drawing, which is a phase diagram of the three-component system $CuO\text{-}Al_2O_3\text{-}SiO_2$, the glass formation region is indicated by the enclosed figure. The approximate amount of the three-components as set forth in the ranges above can be read directly from the diagram. As used herein, the aluminosilicate glasses may contain varying amounts of alkali metal oxides, e.g. sodium oxide, and alkali earth metal oxides, e.g. calcium oxide, barium oxide, and magnesium oxide, within the ranges given above and as illustrated by the glass composition set forth by C. H. Greene in an article entitled "Glass," Scientific American, January 1961. However, the amount of copper oxide is critical and should be within the prescribed range. If the amount of copper oxide is less than about 5 mole percent, the amount and rate of diffusion is so minute that the desired explanation is not obtained; while on the other hand compositions containing greater than 40 mole percent cannot readily be melted to form a homogeneous glass. In actual practice it is recommended to use no more than about 25 mole percent copper oxide.

The melting of the glass compositions set forth above require temperatures usually around 1800° C. and melting times typically of one to six hours depending upon the melts. Since glasses containing copper attack platinum, it was found advantageous to carry out the melting in zirconia vessels. In other respects the glass melting is conventional and standard techniques may be used. After the glass has been fused and cooled it is ground into small solid particles such as for example to pass between 25–70 mesh sieves (U.S. Standard size).

The solid particles are then subjected to a heat treatment during which the particles become expanded and the copper coating forms on the surface. The amount of expansion and the number of hollow spherical particles capable of floating in a carbon tetrachloride bath is a function of both the firing temperature and the firing time. In general, longer firing times and higher firing temperatures increase expansion and produce a greater proportion of floating microspheres. It has been found most effective to maintain the firing temperature in the range of 600–1000° C. and the firing time between 5–120 minutes. In order to obtain an equivalent degree of expansion, the relationship between temperature and time is such that as the temperature is increased, the time may be correspondingly decreased.

It is essential that a hydrogen containing gas be present during the heat treatment. The atmosphere may contain all hydrogen or a mixture of hydrogen and an inert gas such as nitrogen. Thus, forming gas (8% $H_2$+92% $N_2$) has been found effective. It was generally found that the proportion of hydrogen in excess of 8% by volume makes little or no difference in the final product. However, a pure nitrogen atmosphere does not cause foaming and in general other reducing gases, such as carbon monoxide and sulfur dioxide, were not effective.

The solid particles can frequently be placed in a standard furnace for the heat treatment without agglomeration. However, to avoid any such possibility it is preferred that a rotary furnace be used in conjunction with separating particles of approximately the same size. A "96% silica" glass as the term is broadly used has been found effective for this process. The tube in such a furnace is slowly rotated while the hydrogen containing gas is passed through and the furnace is fired to the required temperature for the required time.

The products obtained after the heat treatment are expanded hollow spherical particles or bubbles having a metallic copper coating on the surface. The thin copper film, which is tightly bonded to the surface of the particle after the diffusion process, has particular utility in that it can provide an electrically conductive path through a bed of the microspheres and also acts as a highly reflective layer towards infrared radiation. These expanded particles will float in water and, for example, in the preferred glass set forth in example below, would typically have a density of about 0.5 gm./cc. as compared to an unexpanded density of 2.6 gm./cc. This corresponds to a volume expansion of approximately five times. A primary advantage of these expanded particles is that they are able to withstand relatively high pressures without being destroyed.

In another modification of my invention, the metallic layer may be removed completely from the hollow spheres by standard chemical procedures such as dissolution in acid, etc. Thus, washing for five minutes at room temperature in 50% nitric acid solution removes the copper from the surface without undue dissolution of the glass. The microspheres obtained at this stage are analagous in appearance to those obtained by the heretofore known process discussed above and available commercially.

Alternatively, the metallic layer of copper may be oxidized by heating the coated microspheres to a temperature of about 150° C. in an oxygen containing atmosphere. The metal is converted into the black cupric oxide which exhibits the normal catalytic and electrical properties associated with the oxide.

By way of further illustrating the invention and the manner in which it may be practiced, the following specific example is set forth.

A preferred glass composition of the present invention was prepared and melted to have the following formulation:

| Composition I | Mole percent | Weight percent |
|---|---|---|
| Sodium oxide | 6.1 | 5.4 |
| Calcium oxide | 7.1 | 5.7 |
| Alumina | 18.7 | 27.4 |
| Silica | 58.3 | 50.3 |
| Copper oxide (CuO) | 9.8 | 11.2 |

The glass composition was ground to a particle size of approximately 25–30 mesh and having a density of 2.6 g./cc. These solid glass particles were placed in a tube furnace together with "96% silica" glass particles of about the same size. While the furnace tube was being slowly rotated, the sample was subjected to a heat treatment at a temperature of 900° C. for a period of 60 minutes and in the presence of a forming gas atmosphere (8% hydrogen and 92% nitrogen).

After expansion the hollow spherical particles formed having a copper surface coating were readily separated from the solid "96% silica" glass particles by sieving and immersion in a carbon tetrachloride bath. The dimensions and properties of the expanded particles were as follows:

| | |
|---|---|
| Expanded size (mesh) | 14 |
| Wall thickness, mm. | 0.012 |
| Density-bulk | 0.323 |
| Actual | 0.471 |
| Less Cu coating | 0.41 |
| Strength, p.s.i.:[1] | |
| 5,000 _____ percent survival | 90 |
| 10,000 _____ do | 50–60 |

[1] The strength was determined by measuring the percent survival of the expanded particles after being subjected to a hydrostatic pressure as indicated.

Other compositions of the present invention which have successfully been used to make expanded hollow spherical particles are shown in the table below in which the numerical values are in mole percents.

TABLE

| Composition | II | III | IV | V | VI | VII | VIII |
|---|---|---|---|---|---|---|---|
| SiO₂ | 50.5 | 51.2 | 52.0 | 70 | 55 | 50 | 62.0 |
| Al₂O₃ | 24.3 | 24.6 | 25.0 | 15 | 30 | 15 | 19.8 |
| CuO | 8.6 | 8.6 | 9.3 | 10 | 10 | 30 | 12.7 |
| Na₂O | 7.4 | 7.4 | 7.6 | 5 | 5 | 5 | 5.5 |
| CaO | | 8.3 | | | | | |
| BaO | | | 6.1 | | | | |
| MgO | 9.2 | | | | | | |

I claim:
1. A method of making hollow glass particles comprising the steps of:
   (a) forming solid particles of an aluminosilicate glass containing an effective amount of copper oxide, and
   (b) heating the particles in a hydrogen containing atmosphere at a temperature 600–1000° C. and for a time of 5–120 minutes sufficient to cause migration of the copper ions, whereby a metallic copper coating is formed on the surface of the particle and the particle becomes expanded.

2. The method of claim 1, wherein said glass consists essentially in mole percent of 0–20% alkali metal oxide, 0–10% alkaline earth metal oxide, 5–30% alumina, 50–90% silica, and 5–40% of copper oxide.

3. The method of claim 2, wherein the copper coating is removed by dissolution in acid.

4. The method of claim 2, wherein the copper coating is oxidized to copper oxide.

5. The method of claim 2, wherein the solid particles have an initial size to pass between 25–70 mesh sieves (U.S. Standard size).

6. The method of claim 2, wherein said atmosphere contains at least 8% by volume of hydrogen.

7. A method of making hollow glass spheres capable of withstanding high pressures comprising forming particles of a glass composition consisting essentially in mole percent of 6% sodium oxide, 7% calcium oxide, 19% alumina, 58% silica and 10% copper oxide, said particles having a size to pass between a 25–30 mesh screen, and heating the particles at a temperature of about 850° C. and about 15 minutes in a hydrogen atmosphere to cause migration of the copper ions whereby a metallic copper coating is formed on the surface of the particles and the particles become expanded to a density of 0.4–0.5 gram per cubic centimeter.

References Cited

UNITED STATES PATENTS 3,231,456  1/1966  McMillan et al. _____ 65—30
3,365,315  1/1968  Beck et al. _____ 65—22

S. LEON BASHORE, Primary Examiner.

E. R. FREEDMAN, Assistant Examiner.

U.S. Cl. X.R.

65—22, 30, 32; 106—52; 117—124, 100